United States Patent

[11] 3,557,318

[72] Inventors John J. Buonsante Harrison, N.Y.; Norman J. Syvertsen, Fanwood, N.J.
[21] Appl. No. 582,852
[22] Filed Sept. 29, 1966
[45] Patented Jan. 19, 1971
[73] Assignee American Telephone and Telegraph Company New York, N.Y. a corporation of New York

[54] APARTMENT HOUSE TELEPHONE SYSTEM
3 Claims, 8 Drawing Figs.

[52] U.S. Cl. ........................................................ 179/39, 179/2
[51] Int. Cl. ........................................................ H04m 11/00
[50] Field of Search ........................................... 179/1.4, 2R, 37, 39, 84B, 2RS, 18P&F, 18.02

[56] References Cited

UNITED STATES PATENTS

| | | | |
|---|---|---|---|
| 2,557,161 | 6/1951 | Timms | 179/2(R) |
| 3,112,373 | 11/1963 | Weinberg | 179/84(R) |
| 3,342,934 | 9/1967 | Kohn et al. | 179/18(.02) |
| 3,484,561 | 12/1967 | Matthews | 179/39 |

OTHER REFERENCES

"B.C. Telephone Develops Door-Answering System," Telephony pp. 26, 56,67 July 16, 1966.

*Primary Examiner*—Kathleen H. Claffy
*Assistant Examiner*—Jan S. Black
*Attorneys*—N. S. Ewing, James Warren Falk and Brendan A. Ward

ABSTRACT: A telephone switching arrangement for apartment houses whereby the apartment tenant telephones utilized for normal communication through the central office are also utilized for lobby-apartment conversations and control of lobby door opening mechanisms. The lobby call to a tenant's idle telephone is identified by a distinct ringing signal separate from that normally applied on central office calls. If the tenant line is busy, the lobby call will apply an alerting tone to the busy connection and the tenant may, by means of a monitoring common line relay and holding bridge, place the prior central office call on hold and converse with the lobby. Should the tenant "hang up" after conversing with the lobby, the "held" central office call will rering the tenant's telephone.

INVENTORS J. J. BUONSANTE
N. J. SYVERTSEN
BY
ATTORNEY

APARTMENT HOUSE TELEPHONE SYSTEM

This invention relates to telephone systems and more particularly to telephone switching arrangements for apartment houses wherein telephone circuits are provided between the tenants' apartments and the lobby.

It is common practice in apartment houses to require an individual seeking admission at the outer door to the lobby to identify himself, by speaking to the tenant over a local intercom system. The tenant will then close an electrical circuit unlocking the lobby door. Generally such prior arrangements have been completely divorced from any telephone service that may be provided to the tenants from a central office. In effect, two distinct and separate systems have been required.

It has, however, been proposed that the telephones utilized for normal communication through the central office also be utilized for the lobby-apartment conversations. Such systems may require that the lobby phone be itself connected through to the switching network of the central office or that the lobby-apartment connections be simply an alternative arrangement with the normal central office connections to the apartment telephones.

It is an object of our invention to integrate the lobby-apartment telephone arrangements and the door opening control mechanism into the normal telephone switching arrangements to the central office.

It is another object of our invention to handle simultaneous calls that may be placed to an individual tenant from both the lobby telephone and from the central office. Further, it is an object that such calls can be simultaneously handled regardless of the order in which they are connected to the tenant's telephone.

It is a further object of our invention to utilize common equipment associated with the lobby telephone for all of the central office lines to the various tenants' telephones.

These and other objects of our invention are attained in one illustrative embodiment wherein a single lobby telephone is connectable, in accordance with registered directing digits, to any of the tenants' telephones in a particular apartment house. Each tenant telephone is given a distinctive code which is different than its normal telephone directory number; advantageously only a three digit code is required to identify all of the tenants' telephones in a single apartment house.

Upon selection by the lobby telephone of a particular tenant's telephone, a distinctive ringing signal is applied to the tenant's phone, which ringing signal is different from that normally applied on central office calls. If no other connection is present or is made to the tenant's telephone, the tenant and the visitor in the lobby may converse and the tenant actuate the door opening mechanism, just as in prior intercom systems.

However, in accordance with an aspect of our invention, the lobby call may be established at a time when the tenant is already conversing on a central office call. In this case, when the alerting tone is applied, the tenant may, by a switch hook flash, place the central office connection on a common hold circuit and then converse with the lobby telephone. Upon completion of his conversation with the visitor in the lobby, the tenant may again flash his switch hook to reestablish his connection to the central office line.

In accordance with an aspect of our invention, a single common line relay and a single common holding bridge are provided for the various tenants. Normally this line relay is inserted in the selected tenant's line circuit when his phone is selected by the lobby phone. At this time the line relay can detect if the tenant's phone is on or off hook. In cases where an off-hook condition exists and the line relay detects a switch hook flash, the line relay is then inserted between the common hold bridge and the central office connection and monitors the central office line. Similarly, the common hold bridge at this time is switched to be across the particular tenant's central office line over which the tenant had priorly been talking and to be on the tenant phone side of the line relay, the line relay being held through the bridge by the central office alone.

Our circuitry is therefore arranged to detect when the central office party disconnects while the tenants is conversing with the lobby. The circuitry is further arranged, in accordance with another aspect of our invention, to rering the tenant in case he forgets about the held central office party and merely hangs up after conversing with the lobby visitor.

Further, the common control and switching equipment provided in accordance with aspects of our invention will alert the tenant who is conversing on a lobby connection of an incoming central office call. As a common ringing bridge will then have been inserted in his line circuit, the tenant may then flash his switch hook to answer the new incoming call.

It is a feature of our invention that simultaneous connections may be established to a telephone in an apartment from the normal central office line and from the lobby, the apartment tenant be alerted by the establishment of each connection.

It is another feature of our invention that a line relay which is selectively connected between the tenant's phone and the central office line for monitoring of the tenant's phone connected thereto is switched in the central office line for monitoring of the central office connection when a tenant answers a lobby call with a prior central office call extant.

It is another feature of our invention that a common holding bridge can be connected on the central office side of the line relay or on the tenant phone side of the line relay to be across any of the central office lines to hold the central office connection while the tenant answers a lobby call.

It is a further feature of our invention that circuitry rerings the tenant if, after placing a central office call sn the common holding bridge and answering the lobby call, the tenant forgets about the central office call and merely hangs up when he finishes talking to the lobby.

A complete understanding of this invention and of the above-noted and other objects and features thereof may be gained from consideration of the following detailed description and the accompanying drawing, in which:

FIG. 1 is a block diagram representation of one illustrative embodiment of our invention; and FIGS. 2 through 7, when arranged as shown in FIG. 8, are a schematic representation of the illustrative embodiment of FIG. 1.

Turning now to the drawing, in the illustrative embodiment depicted in FIG. 1 a plurality of individual apartment house tenant subsets SUBOOO through SUB199 are connected over corresponding lines L000 through L199 to a central office 100. The central office may be any of well known switching centers currently in use and its operation in establishing normal connections to the tenants' stations is entirely conventional.

Located in the lobby of the apartment house is a lobby subset 300 and a door lock circuit 303. As in the known systems, a visitor desiring to gain access to the apartment house will establish a connection from the lobby phone 300 to the desired apartment and the tenant will actuate the door lock circuit 303 to allow opening of the lobby door.

A common control and switching unit 104 is provided to allow registration of the called tenant telephone code, selection of the tenant's subset, and control of the circuitry for the handling of simultaneous calls from the lobby and the central office to a tenant. Specifically, cut-through relays 5CT- are provided which selectively connect the lobby subset 300 to the individual tenant subsets SUBOOO — SUB199.

In accordance with an aspect of our invention, a common line relay L is provided. When a tenant, such as at subset SUB019, had been talking on a central office connection and his phone is selected for connection to the lobby phone 300, the line relay L is inserted into the path from the subset SUB019 through to the central office line LO19. With this connection the line relay will then monitor the tenant's subset and specifically to detect switch hook flashes or momentary openings of the subset line, which are utilized as control signals as further explained below. When a central office call is to be held, however, the hold bridge 102 is connected so that the L relay is held only by the central office battery through the hold bridge 102. The hold bridge 102 is thus switched from one side of the L relay to the other so as not to interfere with detection of the switch hook flashes from the tenant subsets, in which case it is on the central office side of the L relay, and also so as to allow the L relax to be held by the central office alone, in which case the holding bridge is on the tenant subset side of the L relay.

The various operating conditions of the circuit include the following:

1. Lobby call to tenant, central office idle.
   a. On a central office call coming in after the lobby connection has been set up the tenant is alerted and may then switch to the central office call, answer it, and then switch back to the lobby call.
2. Lobby call to tenant, central office busy.
   a. Initially the tenant is alerted that a lobby call is present, at which time he can place the central office call on hold and then converse with the lobby.
   b. If the tenant desires to terminate rather than hold the central office call, before transferring to the lobby, he will hang up to initiate a disconnect. When the disconnect is completed, his phone will ring with coded lobby ringing at which time he will lift his receiver to answer the lobby call.
3. Central office call on hold when tenant completes lobby call.
   a. Normally upon completion of the lobby call the tenant can return to the central office call.
   b. If the tenant forgets about the central office call which has been placed on hold, he is rerung by a local ringing generator, which, however, applies normal and not special ringing tones.
4. Lobby call to tenant, central office call abandons.
   a. If the tenant is so long on the lobby call that the central office party disconnects, the line relay, which normally detects openings of the tenant subset line, has been switched into a position to detect the central office line opening and will thereupon release the hold bridge.

DETAILED DESCRIPTION

Selection of the Apartment House Subset

Figure 1:
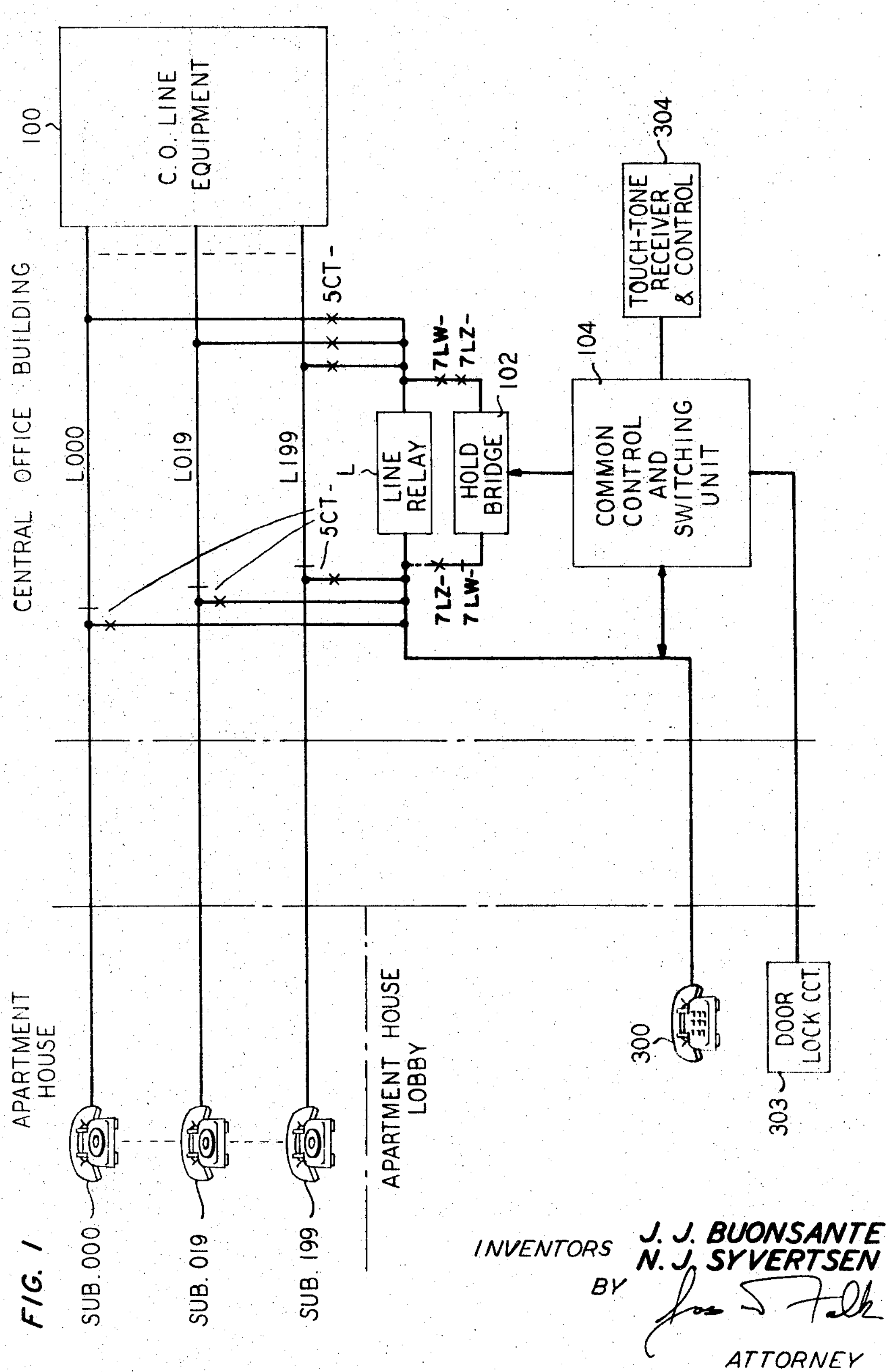

When it is desired to call someone in an apartment from a lobby telephone 300, the handset will be removed from the cradle and the contacts on the telephone set 300 close in the usual manner; this in turn completes the circuit over the lobby telephone line for the operation of a relay 30H from battery through the upper winding of this relay and break contacts 6PC–14, the lobby telephone line and break contacts 6PC–15 to ground through the lower winding of the relay 30H. The operation of relay 30H causes the contacts 30H–22 to operate and connect dial tone or low tone circuit 301 to the line circuit extending to the lobby telephone 300 thus indicating that the circuits are in condition for the transmittal of the apartment house telephone designation. The operation or relay 30H also causes its contacts 30H–8 to close and complete the operating path for relay 6H. The operation of relay 6H causes contacts 6H–2 and 6H–4, FIG. 6, to close and thus prepare the circuitry for registering the dial or call signals transmitted from the apartment house lobby telephone 300.

Upon hearing the dial tone the caller at the apartment house lobby can actuate the key button calling set which causes a plurality of tones to be transmitted from this key set over the apartment house lobby telephone line to the touch-tone receiver 304. This touch-tone calling key set at the apartment house lobby and the touch-tone receiver 304 may be of any suitable type which usually employ voice frequency tone signals.

In the embodiment described herein the circuits at the central office are arranged to respond to three digits for identifying the apartment or tenant's telephone sets such as 019. The actuation of the first key representing the 100's digit causes a plurality of tones to be transmitted from the subset 300 to the receiver 304 and this receiver in turn causes one of the relays 3Y0, 3Y3, 3Y6, or 3Y9 to be operated. In addition, one of the relays 3Z1, 3Z2, 3Z3 are operated and relay 3STR.

Figure 5:
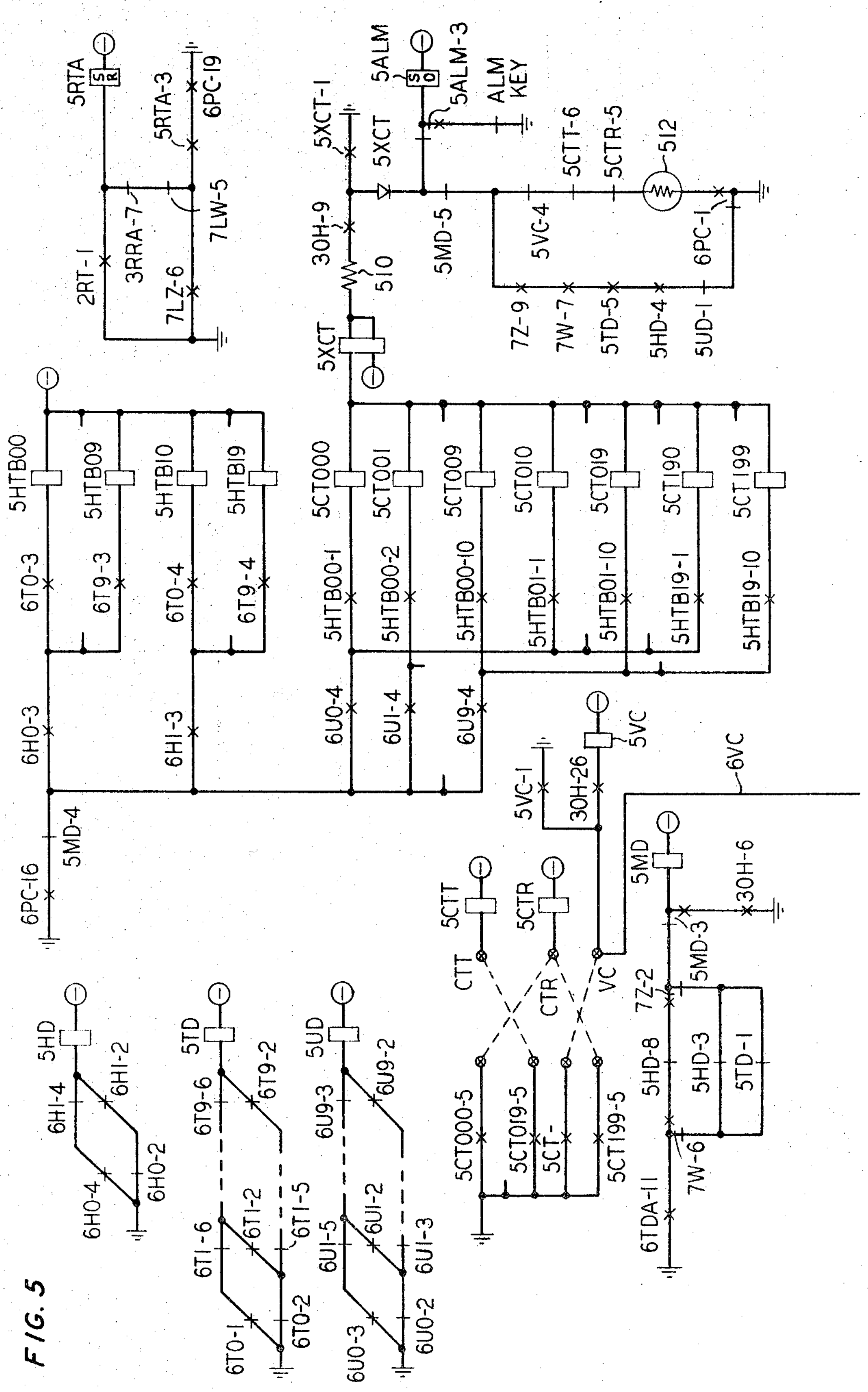
Figure 6:
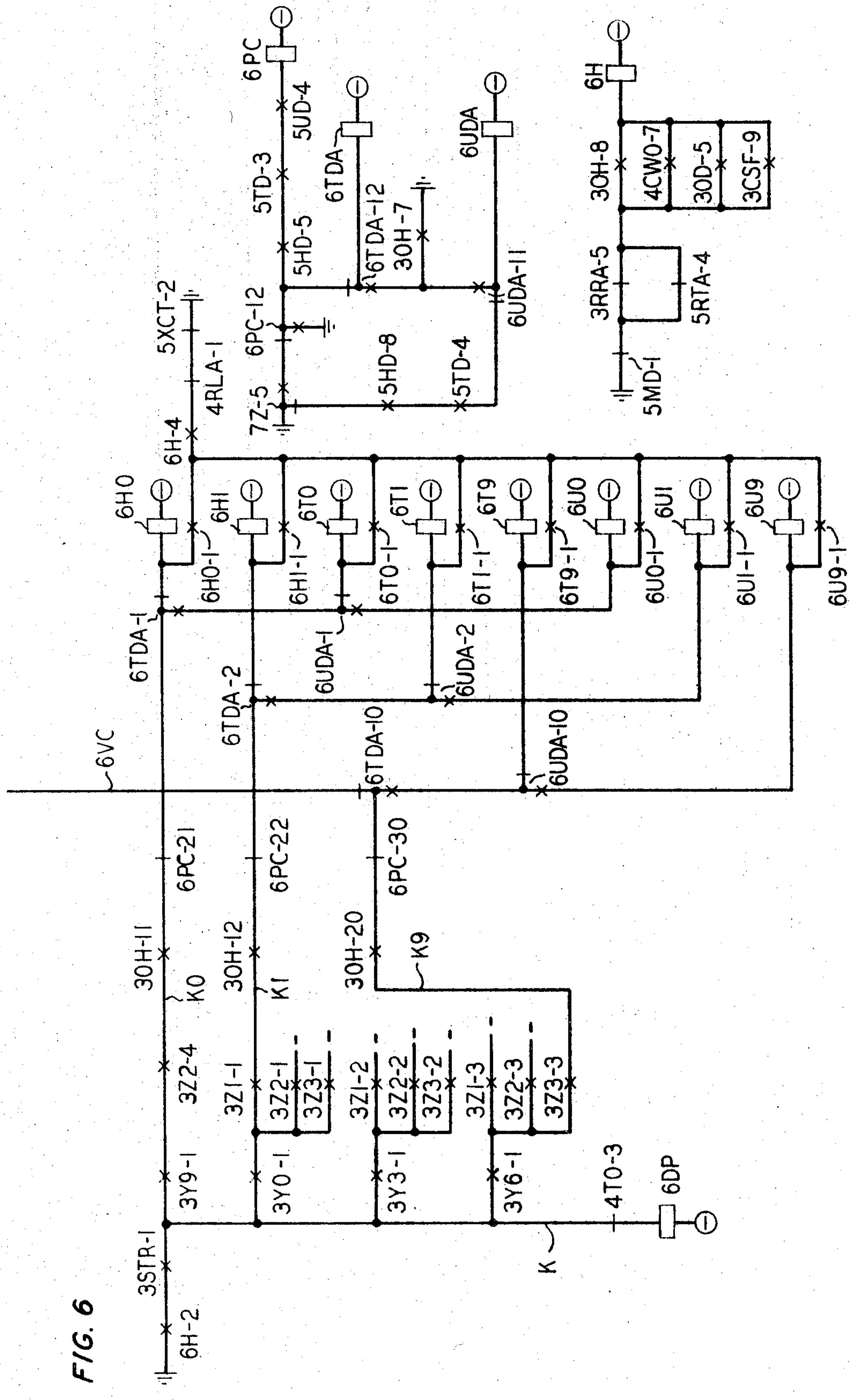

The operation of the 3STR relay causes the contacts 3STR–1, FIG. 6, to close, and the operation of one of the 3Y relays and one of the 3Z relays causes corresponding contacts to close, thereby operating one of the 6H0 or 6H1 relays. If additional 100's digit relays are provided, the corresponding one would operate. Assume for example that the 0 key is pressed indicating a 0 for the 100's digit. As a result the 3Y9 relay and the 3Z2 relay operate causing the contacts 3Y9–1 and 3Z2–4 to close and complete the circuit for the operation of the 6H0 relay from battery to the winding of this relay, break contacts 6TDA–1, break contacts 6PC–21, the operated contacts 30H–11, the operated contacts 3Z2–4 and 3Y9–1 and 3STR–1 and 6H2 to ground. The relay 6H0 when operating causes its contacts 6H0–1 to close and complete a locking circuit from its winding through these contacts, the operated contacts 6H–4, and break contacts 4RLA–1 and 5XCT–2 to ground. Contacts 6H0–2, 6H0–4, 6H1–2, and 6H1– 4 are connected in a one and one only circuit, seen in FIG. 5, and when one such relay 6H0 or 6H1 operates a circuit is completed for operation of the 5HD relay indicating that one and one only of the 100's group of relays is operated.

Figure 3:
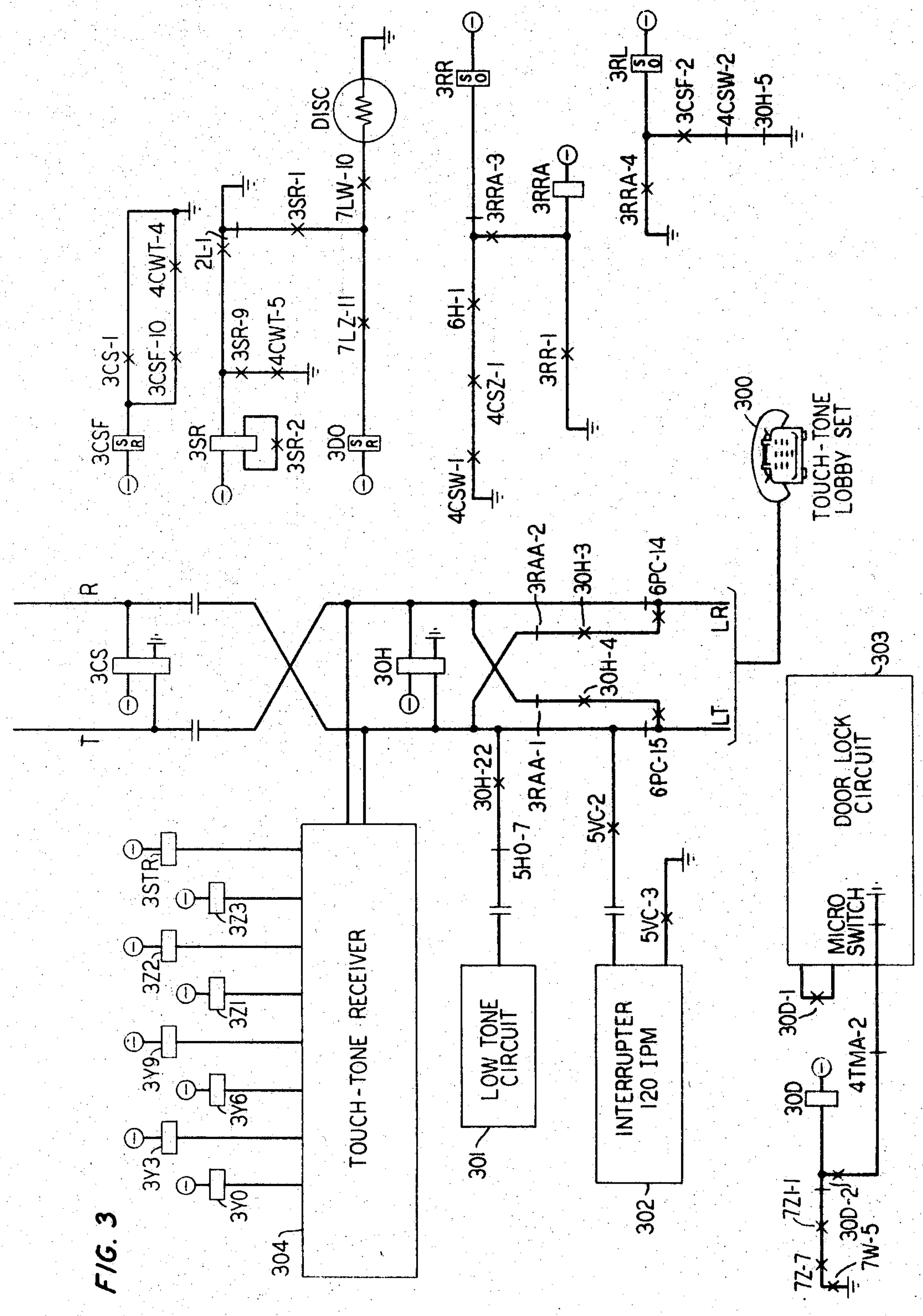

Provision is also made for sending an interrupted tone signal to the lobby telephone in case an unused 100's digit or any other unused tenant phone designation is signaled by the caller in the lobby. This is accomplished by connecting the unequipped 3 to 10 break contacts of the 6TDA relay, which represent vacant hundreds positions, to conductor 6VC and punching VC. Thus, when a vacant hundreds digit is keyed, ground on the particular $k$-lead will operate relay 5VC which locks through the make 30H–26 to its make contact 5VC–1. Relay 5VC in operating closes its contacts 5VC–2 and 5VC–3, fig. 3, to apply an interrupted tone signal from interruptor 302 to the lobby telephone line indicating to the caller that an unused or improper identification signal or key has been sent or operated.

The operation of the 3STR–1 contact, FIG. 6, also completed a circuit for the operation of the 6DP relay from battery to the winding of this relay, the break contacts 4T0–3 and the operated contacts 3STR–1 and 6H–2 to ground. The operation of the 6DP relay causes its contacts 6DP–2 to close and complete a circuit for the operation of the 7W relay from battery to resistor 701, the winding of relay 7W, and break contacts 7W–3 and 4CTL–5 to ground through the operated contacts 6DP—2. A circuit also extends at this time from ground to the 6DP–2 contacts, break contacts 4CTL–5 and 7Z–4, to the right-hand winding terminal of relay 7Z, thus preventing this relay from operating.

The operation of relay 7W causes its contacts 7W–3 to operate and complete a holding circuit to ground through the break contacts 4CTL–6 and the operated contacts 30H–10.

The subsequent release of the 0 key or the first key operated by the calling set 300 removes the tone from the lobby telephone line with the result that the receiver 304 allows the corresponding relays including relax 3STR to release. The release of 3STR opens its contacts 3STR–1 which, in turn, causes relay 6DP to release and, in turn, opens its contacts 6DP–2. As a result the above-described circuit from ground to the right hand winding terminal of relay 7Z is interrupted so that relay 7Z now operates in a circuit from battery to resistor 702, the winding of relay 7Z, the operated contacts 7W–3, break contacts 4CTL–6 and the operated contracts 30H–10 to ground. The operation of relay 7Z causes its contacts 7Z–5, FIG. 6, to be operated which completes a circuit from ground through these contacts and break contacts 6PC–12 and the break contacts 6TDA–12 to battery through the winding of the 6TDA relay. The operation of this relay causes contacts 6TDA–1 and 6TDA–2 to be operated and transfers the conductors from the contacts of the 3Y and 3Z relays to be transferred from the 100 or H group of relays 6HD and 6H1 to the 10's group of relays 6T0 through 6T9. Consequently, upon the operation of the next key from the lobby telephone set, corresponding tones are transmitted to the receiver 304 which in turn causes the operation of one of the 3Y relays and one of the 3Z relays together with the operation of the 3STR relay. As described above, the operation of the 3STR relay causes the 6DP relay to operate and, in addition, one of the relays 6T0 through 6T9 to be operated, thus recording the 10's digit of the desired apartment house telephone. Assume that the No. 1 key of the lobby telephone set 300 has been operated. As a result, the 6T1 relay operates in a circuit from battery through the winding of this relay, break contacts 6UDA–2 and the operated contacts 6TDA–2, break contacts 6PC–22, the operated contacts 30H–12 and the operated contacts 3Z1–1 and 3Y0–1 to ground through the operated contacts 3STR–1 and 6H–2.

Contacts 6T0–2, 6T1–5, etc., FIG. 5, on the 6T0 through 6T9 relays are connected in a one and one only circuit so that the operation of one and one only of these relays, for example 6T1, completes a circuit for the operation of relay 5TD.

Figure 7:
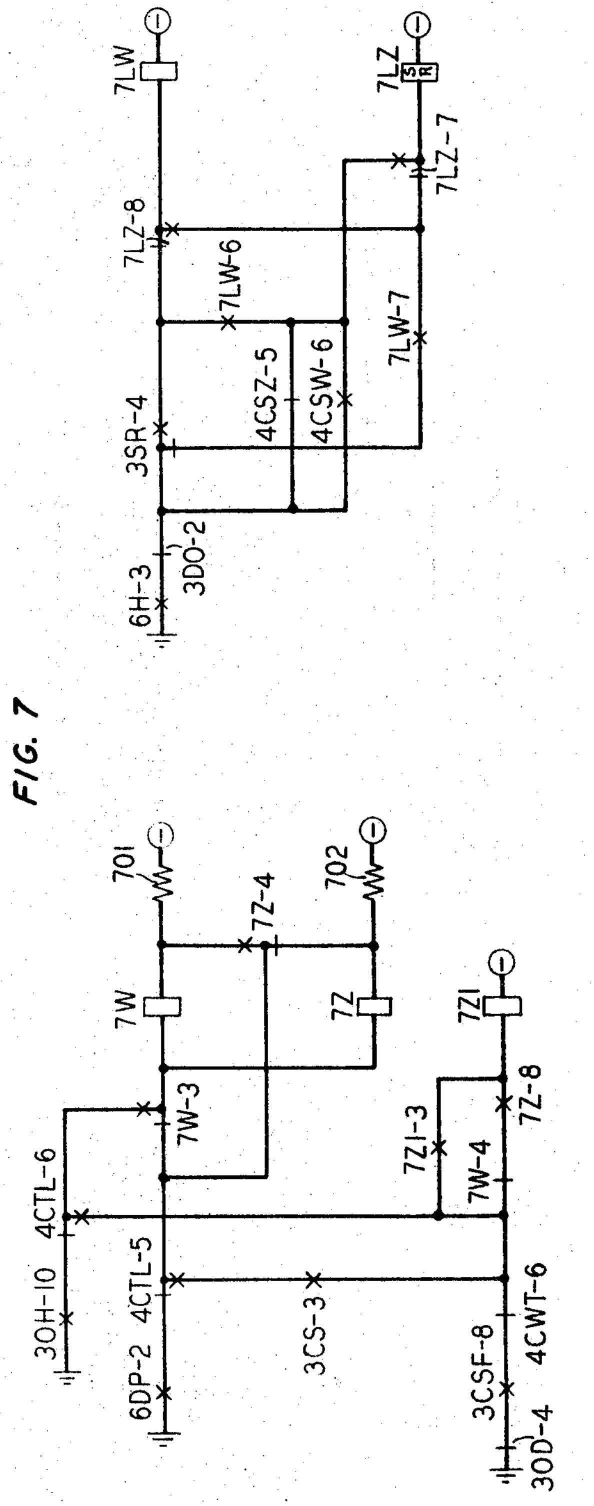
Figure 8:
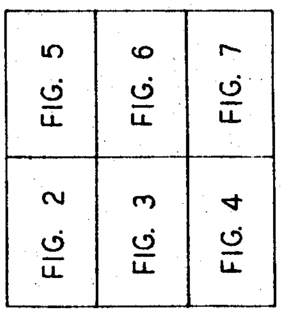

The reoperation of the relay 6DP causes its contacts 6DP–2, FIG. 7, to close and connect ground to the right hand winding of relay 7W in the circuit extending from ground through the operated contacts 6DP–2 and break contacts 4CTL–5, operated contacts 7Z–4 to the right-hand winding terminal of relay 7W. Since ground is now connected to both winding terminals of this relay, the relay releases and causes its contact 7W–3 to open, thus interrupting the above-described holding circuit for relax 7W and also for relay 7Z. However, relax 7Z is maintained operated at this time on a circuit from battery to resistor 702, the winding of relay 7Z, and the break contacts 7W–3 and 4CTL–5 to ground through the operated contacts 6DP–2.

Upon the subsequent release of the 10's digit key, assumed to be a 1, at the lobby telephone set 300, relays 3Z1, 3Y0, and 3STR are released with the result that the relay 6DP releases. The release of relay 6DP at this time opens its contacts 6DP–2 which interrupts the above-described holding circuit for relay 7Z thus permitting this relay to release. Release of relay 7Z at this time completes the circuit from ground through its break contacts 7Z–5 and the now operated contact 5HD–8 and 5TD–4 and the break contacts of relay 6UDA–11 to battery through the relay 6UDA. This relay, upon operating, closes its contacts 6UDA–11 and completes the holding circuit for maintaining itself operated from battery through its winding and its operated contacts 6UDA–11 to ground through the operated contacts 30H–7.

Next the lobby caller will depress the third key of his set 300 for setting the units digit or designation. Assuming that the No. 9 key is depressed then again two tones, designating the 9's digit, will be transmitted from the lobby set to the receiver 304 which again causes one of the 3Y relays and one of the 3Z relays to operate and also the relay 3STR. The operation of this relay causes its contacts 3STR–1 to close and again operate the 6DP relay. The closure of the 3STR–1 contacts together with the closure of the appropriate 3Y6–1 and 3Z3–3 contacts will complete a circuit for the operation of the 6U9 relay through the operated contacts 30H–20, break contacts 6PC–30, and the operated contacts 6TDA–10 and 6UDA–10.

The operation of one and one only of the 6U0 through 6U9 relays completes the circuit through the one and one only contact network, FIG. 5, for the operation of the 5UD relay, which relay then operates. The operation of the 6DP relay, as described above, again closes its contacts 6DP–2 and again causes the operation of relay 7W and at the same time maintains relay 7Z short circuited thus preventing this relay from operating.

Thus, when the caller releases the key at the key set 300, the tones are removed from the line extending through the receiver 304 and as a result the previously operated relays 3Y6 and 3Z3 and 3STR are released. The release of the 3STR relay causes its contacts 3STR–1 to open and release the 6DP relay. Release of this relay in turn allows its contacts 6DP–2 to open and permit relay 7Z to operate in the manner described above. As a result the contacts 7Z–5 again close and this time complete a circuit for the operation of relay 6PC from battery to the winding of relay 6PC, the now operated contacts 5UD–4, 5TD–3, and 5HD–5, and break contacts 6PC–12 to ground through the operated contacts 7Z–5. As a result, contacts 6PC–12 operate and complete a holding path for relay 6PC independent of the operation of relay 7Z.

The operation of the relay 6PC relay closes its contacts 6PC–16, FIG. 5, and the closure of these contacts together with the previous operation of the 6H0 or 6H1 relay and the previous closures of contacts of one of the 6T0 to 6T9 relays causes the operation of the corresponding 5HTB-relay which, under the assumed condition, will be the 5HTB01 relay.

The operation of the 5HTB01 relay causes its contacts 5HTB01–10 to close and complete a circuit for the operation of the cut through relay 5CT019 for the subscriber line or subset 019. This circuit extends from ground through the operated contacts 6PC–16, break contacts 5MD–4, the operated contacts 6U9–4 and the operated contacts 5HTB01–10 and the winding of relay 5CT019 and then through the upper and lower windings of the 5XCT relay to battery. The relay 5XCT is a marginal relay and will operate only if the circuit through its upper winding extends through more than one of the cut through relays 5CT000 through 5CT199. If the 5XCT relay operates, it locks through resistor 510 and the operated contacts 30H–9 to ground on its 5XCT–1 make contact. Ground from the operated 5XCT–1 contact also operates the alarm relay 5ALM to indicate a trouble condition. The operated 5XCT–2 contact, FIG. 6, opens the locking circuit of the operated 6H– 6T– and 6U– relays causing the release of these relays and all operated 5CT– elays. If the circuit through only one of the 5CT– relays 5CT000 through 5CT199 is completed as described above then relay 5XCT does not operate but the 5CT– relay, such as relay 5CT019, does operate and cuts through the subscriber's line to the lobby telephone line circuits shown in FIGS. 2 and 3.

Figure 2:
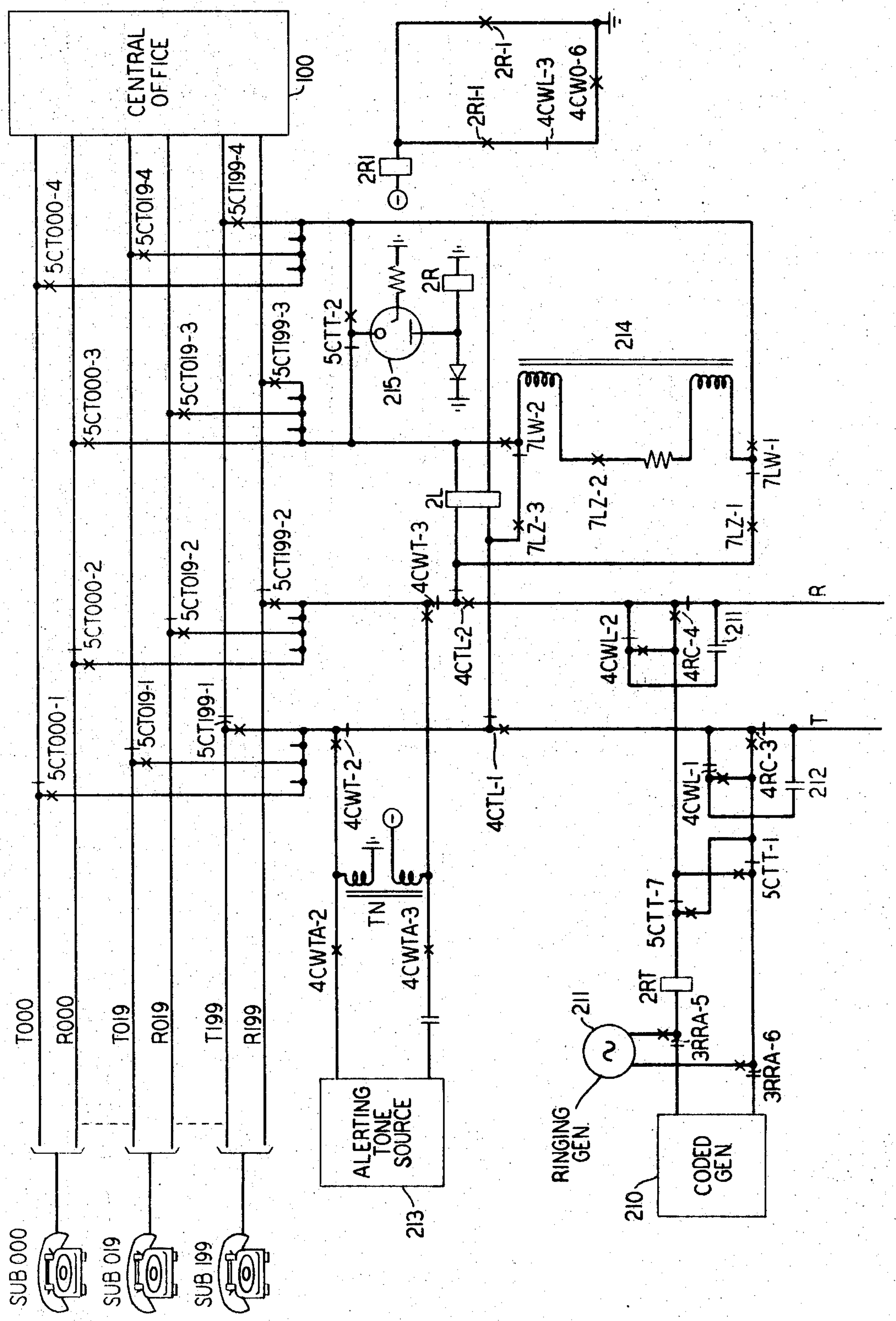

The operation of relay 5CT019 causes its contacts 5CT019–1 and 5CT019–2, 5CT019–3 and 5CT019–4, FIG. 2, to close, which contacts insert the lower winding of relay 2L in the tip conductor T019 of the apartment house line 019 and the upper winding of relay 2L in the ring conductor R019 of this line. The operation of relay 5CT019 also closes its contacts 5CT019–5, FIG. 5, which completes a circuit for the operation of one of the 5VC, 5CTT, or 5CTR relays. These contacts are cross connected to one of these relays depending upon whether the ringer at the apartment subset 019 is connected to the tip conductor (CTT) or to the ring conductor (CTR) or is an unassigned code (VC). By utilizing break contacts on each of these relays a check is made at this time to insure that a CT– relay has operated. If one has not operated in 200 to 500 ms. after relay 6PC operates, a circuit is closed to operate the alarm relay 5ALM from ground at the operated contact 6PC–1 through the thermister time delay 512, the normal contacts 5CTR–5, 5CTT–6, 5VC–4, 5MD–5, 5ALM–3, to the 5ALM winding to battery. In this embodiment subset 019 is assumed to have its ringer connected to the tip conductor so the cross connection is to relay 5CTT. The 5CTT relay operated operates relay 4CWL relay through make contacts 5CTT–5 and break contacts 4CTL–4. Relay 4CWL operated starts a 5 -second monitoring period of the tenant's line, by removing ground from the start lead of the time delay control circuit 401. This monitoring period is made to exceed 4 seconds since the central office may be ringing the tenant's phone during this period. In this case, the common ringing bridge will detect the ringing causing relay 2R1 to operate and recycle the timer with each burst of machine ringing.

Tenant Subset Busy - Alerting Tone

Figure 4:
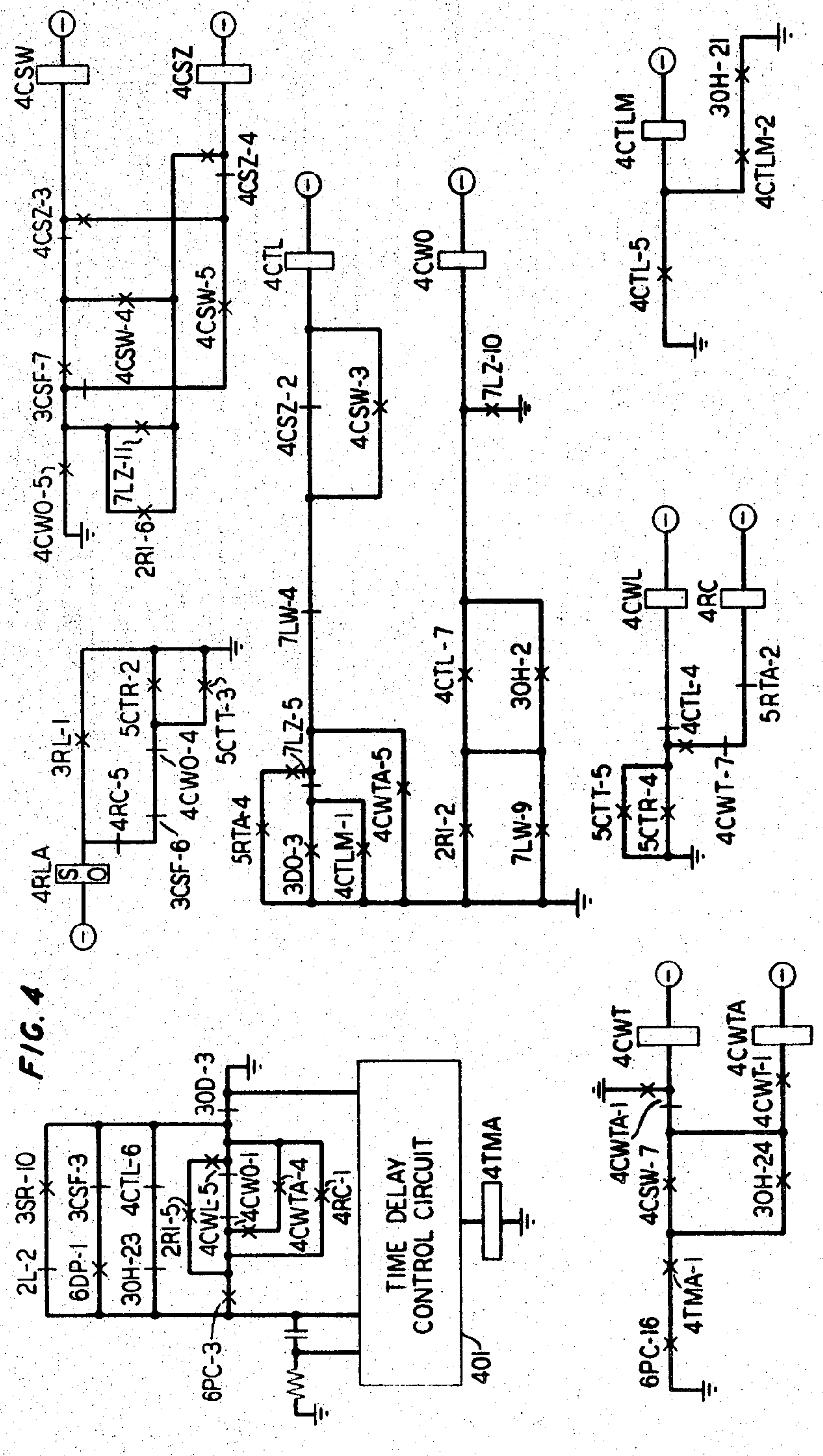

If the subsecriber's line is busy on a central office call at the time the call from the lobby telephone set 300 is directed to this line as described above, then relay 2L is operated during the 5 second monitoring interval with the result that contacts 2L–1 close and complete an obvious circuit for the operation of relay 3SR. Relay 3SR in operating closes its contacts 3SR–2 which short circuits the lower winding of this relay to make the relay slow in releasing. The operation of relay 3SR at this time causes its contacts 3SR–4, FIG. 7, to close thereby completing an operating path for relay 7LW from battery through the winding of relay 7LW, break contacts 7LZ–8, make contacts 3SR–4, break contacts 3DO–2, and operated make contacts 6H–3 to ground. Contacts 7LW–9, FIG. 4, thereupon close and complete a circuit for the operation of relay 4CWO through contacts 30H–2.

Five seconds after the operation of the 4CWL relay, as described previously, control circuit 401 applies battery on its output lead to operate relay 4TMA. Relay 4TMA operates the 4CWT relay in a circuit from battery through the winding of relay 4CWT, break contacts 4CWTA–1, make contacts 30H–24 and operated make contacts 4TMA–1 and 6PC–16. Relay 4CWT in operating closes an obvious path through contacts 4CWT–1 for operation of relay 4CWTA. Relay 4CWTA transfers control of the operation of relay 4CWT from the priorly described operating path to a direct ground by operation of contacts 4CWTA–1.

It is desired at this time to apply a very short alerting tone to the apartment subset 019 advising him that a call has been placed to him from the lobby phone 300. This tone is applied from a tone source 213 through operated contacts 4CWTA–2, 4CWTA–3, operated contacts 4CWT–2, 4CWT–3, and the operated contacts 5CT019–1, 5CT019–2. The duration of this alerting tone is very short because relay 4CWTA, in addition to applying the tone to apartment subset, also reapplies the control ground to the start lead of the time delay control circuit 401 by closure of contacts 4CWTA–4. This causes recycling of the control circuit 401 and removal of the ground from relay 4CWTA, causing that relay and relay 4CWT to release. Release of these relays removes the alerting tone from the line. Relay 4CWTA released also removes the ground from the start lead of the timing circuit to start timing for the next alerting tone.

Tenant Subset Idle

Alternatively, if the subscriber line is not busy when relay 5CT019 operates then relay 2L or 2R1 does not operate and relay 7LW remains nonoperated. Consequently, after the 5-second monitoring period the operation of relay 4CWTA as described previously will operate the 4CTL relay, from battery through the winding of relay 4CTL, break contacts 4CSZ–2, break contacts 7LW–4 (as relay 2L has not operated), and closed contacts 4CWTA–5. Relay 4CTLM is operated over an obvious path on closure of contacts 4CTL–5 and is held operated by its own contacts 4CTLM–2. Relay 4CTLM also closes its contacts 4CTLM–1 whereby relay 4CTL remains operated after release of relay 4CWTA upon recycling of the control circuit 401, as described above. Relay 4CTL in operating actuates its contacts 4CTL–4 and transfers the circuit through operated contacts 5CTT–5 from the winding of relay 4CWL to battery through the break contacts 5RTA–2 and the winding of relay 4RC to operate relay 4RC.

The operation of either relay 5CTT or 5CTR also causes the operation of one or the other of the break contacts 5CTT–6 and 5CTR–5 which interrupts the above-described circuit of relay 5ALM thus preventing the operation of this slow-operate relay. The relay 5CT019 then remains operated in the above-described circuit from battery through both of the windings of relay 5XTC.

The operation of the 4CTL relay causes its contacts 4CTL–6 to open and interrupt the holding circuits for relays 7W and 7Z, thus causing these relays to release.

The above-described operation of relays 4CTL and 4RC completes a circuit for the applying of ringing current to the called subscriber's line circuit which circuit extends from the coded ringing generator 210 and the break contacts 3RRA–5 and 3RRA–6, either the operated or released contacts 5CTT–7 and 5CTT–1, the operated contacts 4RC–4 and 4RC–3, the operated contacts 4CTL–2 and 4CTL–1 and the operated contacts 5CTO19–1 and 5CTO19–2 to the subset 019 in the called tenant's apartment. As a result, ringing current is applied to this line to call any subscriber. This ringing current also flows through the winding of the ring trip relay 2RT but so long as the subscriber does not answer relay 2RT does not operate. The ringing signal is also transmitted through condensers 211 and 212 to the lobby set 300.

If the call is abandoned from the lobby set 300 at any time relay 30H releases and opens the various operated contacts described above and restores the circuit to normal or usual conditions.

If instead the call is answered at the subset 019, then relay 2RT operates and closes its contacts 2RT–1 which completes a circuit for the operation of relay 5RTA. The operation of this relay closes its contacts 5RTA–3 and completes the holding circuit for maintaining itself operated from battery through the winding of this relay, break contacts 3RRA–7, 7LW–5 and the operated contacts 5RTA–3 and 6PC–14 to ground. The operation of relay 5RTA opens its contacts 5RTA–2 which causes relay 4RC to release and interrupt the ringing current to the subscriber's set. In addition, the release of relay 4RC now extends the circuit of this subscriber's set to battery and ground through the winding of the 3CS relay which operates and supplies talking battery to the subscriber's set.

Relay 3CS operates over the line circuit to the apartment subset 019 and causes its contacts 3CS–1 to close and complete an obvious circuit for the operation of relay 3CSF. The operation of relay 3CSF causes its contacts 3CSF–8 in FIG. 7 to close and complete a circuit for the operation of relay 7W from battery to resistor 701, the winding of relay 7W and break contacts of 7W–3, the now operated contacts 4CTL–5, the operated contacts 3CS–3, break contacts 4CWT–6, operated contacts 3CSF–8 to ground through the break contacts 30D–4. Relay 7W in operating completes a holding path for maintaining itself operated from battery through the winding of relay 7W, the operated contacts of relay 7W, 7W–3, the operated contacts of 4CTL–6, break contacts 4CWT–6 and the operated contacts 3CSF–8 to ground through the break contacts 30D–4. In addition ground is connected to both winding terminals of relay 7Z through the above-described operating and holding circuit of relay 7W so that relay 7Z does not operate at this time.

Opening of Lobby Door

The lobby caller may now talk from the lobby subset 300 to the apartment subset 019. If the tenant in the apartment house is satisfied of the identity of the caller the apartment house tenant may permit the lobby door to be opened by dialing 3. In dialing3 the dial at the apartment subset 019 opens and closes the line 019 three times in the usual manner. Upon the first opening of the dial the relay 3CS releases. Relay 3CSF is a slow-release relay so that it does not release during these dial pulses. Instead it is maintained operated during the dialing of this number from the tenant's station.

Relay 3CS in releasing opens its contacts 3CS–3, FIG. 7, and thereby removes the ground connected through the right hand terminal of relay 7Z thus permitting this relay to operate over the holding circuit of relay 7W from battery, the resistor 702, the winding of relay 7Z, the operated contacts of 7W–3, the now operated contacts 4CTL–6 to ground through break contacts 4CWT–6, the operated contacts 3CSF–8 and break contacts 30D–4.

The operation of relay 7Z causes its contacts 7Z–4 to close which transfers the shunting circuit from the right hand winding terminal of relay 7Z to the right-hand winding terminal of relay 7W.

Then when the first dial pulse is terminated and the subscriber line 019 recloses, relay 3CS reoperates and recloses its contacts 3CS–3 with the result that ground is now connected to the right-hand terminal of relay 7W through break contacts 30D–4, the operated contacts 3CSF–8, break contacts 4CWT–6, operated contacts 4CTL–5 and 7Z–4. As a result relay 7W is shunted down or released and interrupts the above-described operated circuit for relay 7Z. Relay 7Z is nevertheless maintained operated by the above-described circuit for releasing relay 7W through the break contacts 7W–3.

The operation of relay 7Z and the release of relay 7W completes a circuit for the operation of relay 7Z1 from battery through the winding of relay 7Z1, the operated contacts 7Z–8 and the break contacts 7W–4, break contacts 4CWT–6, the operated contacts 3SCF–8 and the break contacts 30D–4 to ground. The operation of relay 7Z1 causes its contacts 7Z1–3 to close and establishes a holding path for this relay independent of contacts 7W–4 and 7Z–8.

Thereafter when the dial contact opens at the beginning of the second dial pulse the tenant's line circuit is again opened with the result that relay 3CS again releases and interrupts the above-described holding circuit for relay 7Z thus permitting this relay to release. At the end of this second dial pulse the dial recloses the tenant's line 019 which in turn causes relay 3CS to operate and recloses contacts 3CS–3 with the result that relay 7W is again operated in the above-described circuit.

At the beginning of the third dial pulse the dial in the tenant's subset 019 again opens and causes relay 3CS to again release with the result that relay 7Z now operates and relay 7W remains operated.

The operation of relay 7Z at this time together with the previous operation of relay 7Z1 and 7W described above completes the circuit for the operation of relay 30D from battery through the winding of relay 30D, the break contacts of 30D–2, the operated contacts 7Z1–1, 7Z–7 and 7W–5 to ground. The operation of relay 30D causes its contact 30D–2 to close and complete a holding circuit under control of the contacts 4TMA–2 and the microswitch within the door lock circuit 303. The operation of relay 30D also causes its contacts 30D–1 to close which actuates the door lock circuit 303; this circuit in turn actuates the equipment of the lobby door lock so that the caller in the lobby may now open the door.

Prior to opening the door the caller in the lobby will replace the handset in the cradle with the result that the lobby line circuit of the subset 300 is interrupted; the relay 30H then releases and opens the various make contacts described above so that the circuits will return to their normal condition. Likewise, the tenant will place the handset on the subset 019 and allow relay 3CS to release which in turn permits other circuits to be restored to their idle condition. After the door is opened, or after a predetermined time, the door lock circuit 303 functions to operate the microswitch which operates and opens its contacts which permits relay 30D to release.

Tenant Subset Busy - Hold Circuit Control

As described above if the teant's line is busy when a call is made to the tenant from the lobby set 300, the operation of the cut-through relay, such as 5CT019, causes the contacts 5CT019–1, 5CT019–2, 5CT019–3 and 5CT019–4 to close and connect the windings of the 2L relay in series with the line to the subscriber's or tenant's subset. As a result the 2L relay operates and in turn causes its contacts 2L–1 to operate which causes relay 3SR and in turn relay 7LW to operate. As a result of the closure of contacts 7LW–9 relay 4CWO operates and relay 4CTL is prevented from operating when relay 4CWTA operates after the 5-second monitoring period, and as a result relay 4CWL operates instead of relay 4RC.

The operation of relay 7LW also causes its contacts 7LW–1 and 7LW–2 to close which prepares a holding bridge circuit to be connected across the tenant's line circuit through the contacts 5CT019–3 and 5CT019–4, the operated contacts 7LW–1 and 7LW–2, the impedance coil windings 214, to the not yet operated 7LZ–2 contacts.

In addition, the operation of relay 4CWO caused contacts 4CWTA–2 and 4CWTA–3 to close and apply an interrupt tone through the operated contacts 4CWT–2 and 4CWT–3 to the tenant's line through the operated contacts 5CT019–1 and 5CT019–2, as described above.

The tenant, upon hearing the interrupted tone, can then inform the calling party that another party is waiting and ask the other party to hold on for a time or he may terminate his central office call by disconnecting and waiting for his phone to ring or the tenant may continue to talk with the other party. If the tenant decides to ask the other calling party to wait, he will place the line circuit in the hold condition by momentarily operating and then releasing the cradle or off-normal switch of his subset. As a result the tenant's line circuit is first opened and then closed.

Upon opening of the line circuit the relay 2L releases, and in turn causes relay 3SR to release.

Relay 3SR in releasing releases its contacts 3SR–4 in FIG. 7 with the result that the circuit is now completed for the operation of relay 7LZ from ground through the operated contacts 6H–3, the break contacts 3DO–2, the break contacts 3SR–4, the operated contacts 7LW–7 and the break contacts 7LZ–7 to battery through the winding of relay 7LZ. At this time relay 7LW is maintained operated as a circuit is extended from battery through its winding and the break contacts 7LZ–8, the operated contacts 7LW–6, break contacts 4CSZ–5 and 3DO–2 to ground through the operated contacts 6H–3. Upon the operation of relay 7LZ the holding circuit for the relay 7LW is transferred from battery through the winding of this relay and the operated contacts 7LZ–8, the operated contacts of relay 7LW–7, the break contacts 3SR–4 to ground through the break contacts 3DO–2 and the operated contacts 6H–3. In addition, the operation of relay 7LZ completes a locking circuit from battery through its winding and operated contacts 7LZ–7 and the break contacts of contacts 4CSZ–5 and 3DO–2 to ground through the operated contacts 6H–3.

Relay 7LZ operated completes the holding bridge towards the central office while the tenants switchhook contacts are open. The holding bridge is on the central office side of the line relay at this time. In this way the 2L relay can still monitor the tenants switchhook for an off hook condition. The circuit will time the on hook condition (7LW and 7LZ both operated) and if an off hook is not received after a 2 -second period, relay 3DO will operate through the disc thermistor DISC and the operated 7LW–10 and 7LZ–11 contacts. Relay 3DO is a slow release relay and when operated will open the holding circuit for the 7LW and 7LZ relays, releasing these relays and in turn the holding bridge towards the central office. With both the 7LW and 7LZ relays released and the slow release relay 3DO still operated a circuit is closed to operate the 4CTL relay. Relay 4CTL operated operates the 4RC relay which causes the tenants phone to ring as described previously.

If the tenant's line recloses prior to the 2-second timing interval, relay 2L again operates and causes relay 3SR to reoperate. Relay 3SR in reoperating reoperates its contacts 3SR–4 with the result that the above-described holding or locking circuit for relay 7LW is interrupted so that this relay now releases. The release of relay 7LW together with the operation of 7LZ as described above completes a circuit for the operation of relay 5RTA from battery through the winding of relay 5RTA, break contacts 3RRA–7 and break contacts 7LW–5 and the operated contacts 7LZ–6. The operation of relay 5RTA closes its contacts 5RTA–3 and completes a locking circuit for maintaining itself operated, which circuit extends from battery through the windings to break contacts 3RRA–7 and 7LW–5 and the operated contacts 5RTA–3 and 6PC–19. The operation of relay 5RTA also opens its contacts 5RTA–2 and thus prevents the operation of relay 4RC.

The release of relay 7LW and the operation of relay 7LZ also transfers the holding bridge from the right-hand winding terminal of relay 2L to the left-hand winding terminal of relay 2L so that the holding bridge now extends from operated contacts 5CT019-3, the upper winding of relay 2L, the operated contacts 7LZ-1 and the break contacts 7LW-1, the coil of inductance 214, operated contacts 7LZ-2, break contacts 7LW-2, the operated contacts 7LZ-3, the lower winding of relay 2L and the operated contacts 5CT019-4 to the subscriber's line circuit extending to the central office. Thus, the relay 2L is maintained operated by current flowing through this bridge circuit and sent over the tenant's line circuit from the central office.

The release of relay 7LW and the operation of relay 7LZ also completes a circuit for the operation of the cut-through relay 4CTL, which circuit extends from battery to the winding of this relay, break contacts 4CSZ-2 and 7LW-4 and the operated contacts 7LZ-5 and 5RTA-4 to ground. Relay 4CWO is also maintained operated over an obvious path on closure of contacts 7LZ-10.

The operation of relay 4CTL causes its contacts 4CTL-1 and 4CTL-2 to close and extend the tenant's line circuit to the winding of the supervisory relay 3CS thus causing this relay to operate and in turn close its contacts 3CS-1 which completes a circuit for the operation of relay 3CSF. This in turn completes a path from battery through the winding of 4CSW, break contacts 4CSZ-3 and the operated contacts 3CSF-7 and 4CWO-5 to ground for operation of relay 4CSW.

The tenant may now communicate over the above-described path with the caller in the lobby through the lobby set 300. If the tenant desires, he may dial 3 to condition the lobby door lock circuit 303 so that it may be opened by the caller in which case the circuit responds to the 3 dial by the tenant in the manner described above and causes the various relays 7W, 7Z and 7Z1 to respond to the operation of relay 3CS in the manner described above. Upon dialing of the 3, the lobby caller will restore the handset to the cradle of the calling set 300 and open the door in the manner described above. In addition, the tenant will again flash or momentarily operate the cradle switch which will then restore the connection of his subset 019 to the caller through the central office equipment.

When the subscriber operates the cradle contacts, his line circuit opens and interrupts the operating circuit of relay 3CS, thus permitting this relay to release and in turn cause relay 3CSF to release. Release of this relay then extends a circuit for the operation of relay 4CSZ from battery through the winding of relay 4CSZ and the break contacts 4CSZ-4, the operated contacts 4CSW-5, the break contacts 3CSF-7 to ground through the operated contacts 4CWO-5. The operation of relay 4CSZ causes its contacts 4CSZ-4 to close and complete a locking circuit for maintaining relay 4CSZ operated from battery through the winding of this relay to ground through the operated contacts 7LZ-11 and 4CWO-5. The operation of relay 4CSZ also establishes a locking circuit for maintaining relay 4CSW operated from battery through the winding of relay 4CSW, the operated contacts 4CSZ-3 and 4CSW-5, break contacts 3CSF-7 to ground through the operated contacts 4CWO-5.

When the tenant releases the cradle switch the tenant's line circuit will reclose and cause relay 3CS to reoperate and cause relay 3CSF to in turn reoperate with the result that the above-described circuit for maintaining relay 4CSW operated is interrupted at the break contacts 3CSF-7, thus permitting relay 4CSW release. Release of relay 4CSW this time opens its previously operated contacts 4CSW-3 thus permitting 4CTL to release since the break contacts 4CSZ-2 are now open due to the operation of relay 4CSZ.

Release of relay 4CTL opens its contacts 4CTL-1 and 4CTL-2 and thus restores the subscriber's line circuit to the central exchange through the winding of relay 2L; relay 3CS also releases, in turn releasing relay 3CSF.

The operation of relay 4CSZ opens its break contacts 4CSZ-5 thus interrupting the locking circuit of relay 7LZ which permits this relay to release and remove the holding bridge from across the subscriber's line circuit. In addition, the release of relay 7LZ again completes the above-described operating circuit for relay 7LW which relay now reoperates.

The release of relay 7LZ releases relay 4CWO. Relays 4CWO and 3CSF released causes relay 6H to release. Relay 6H released opens its contacts 6H-4 allowing the operated ones of relays 6HO, 6H1, 6T0 through 6T9 and 6U0 through 6U9 to release; this in turn causes the release of the cut-through relay 5CT019 thus restoring the tenant's line circuit to the central office caller and removing the connection to the lobby set 300 and the door opening mechanism. The other relays likewise release restoring the circuit to its idle or normal condition.

Rering of Tenant Subset

After the tenant has finished talking to the lobby he may forget that he had priorly left a central office conversation and that the central office party has been placed on the common hold circuit. Accordingly, our circuit under these conditions will rering the tenant, using normal central office ringing rather than the special alerting tone used initially to advise him of the lobby call. Thus if at the termination of the conversation with the caller at the lobby touch-tone set 300, after the subscriber has either dialed 3 or refused to permit the called to visit him, a subscriber merely replaces his handset on the cradle instead of momentarily operating the cradle contacts as described above, the tenant's line circuit will be opened and remain open with the result that relay 3CS releases in the manner described above and causes relay 3CSF to release and complete the above-described circuit for the operation of relay 4CSZ. This relay in turn completes the locking circuit for maintaining itself operated and the locking circuit for maintaining relay 4CSW operated. As a result, both of these relays remain operated and complete a circuit for the operation of relay 3RR. This relay is a slow-operate relay requiring appreciable time to operate and may be a thermal operated relay in an exemplary embodiment of the invention. Normally, if the tenant releases the cradle contacts as described above, relay 3RR will not operate. Alternatively, if the handset is placed on the cradle and the contacts not again released, then relay 3RR operates after a predetermined time interval in a circuit extending from battery through relay 3RR, break contacts 3RRA-3, operated contacts 6H-1, 4CSZ-1, 4CSW-1 to ground. Relay 3RR in operating closes its contacts 3RR-1 and now completes the circuit for the operation of relay 3RRA from battery through the windings of relay 3RRA, operated contacts of 3RR-1 to ground. Relay 3RRA then locks from battery through its winding through operated 3RRA-3, 6H-1, 4CSZ-1 and 4CSW-1 to ground.

The operation of relay 3RRA causes its contacts 3RRA-7, FIG. 5, to operate and interrupt the above-described locking circuit for relay 5RTA which permits this relay to release and complete an operating circuit for relay 4RC. The operation of relay 3RRA and the operation of relay 4RC applies ringing current from the ringing generator 211 through the operated contacts 3RRA-5 and 3RRA-6, and break or operated contacts 5CTT-1 and 5CTT-7, the operated contacts 4RC-3 and 4RC-4, and the operated contacts 5CT019-1 and 5CT019-2 to the tenant's line, thus recalling the tenant. When the tenant again answers, the relay 2RT reoperates and causes relay 5RTA to operate and interrupt the circuit of relay 4RC, thus permitting this relay to release and interrupt the connection of the ringing generator 211 to the line.

Relay 6H also releases at this time, and as a result the operated ones of units, tens, and hundreds relays release. The cut-through relay 5CT019 is thus released and the tenant subset 019 is Office Call While through to the central office.

Central Office Call While Tenant on Lobby Connection

If the tenant's line is initially idle when a call is placed from the lobby set 300 in the manner described above, the circuit operates in the manner described above. If during this time a call is directed to this tenant's line from the central office equipment, the ringing current will be applied to the subscriber's line from the central office equipment and cause a gas tube 215 to break down and operate relay 2R. Relay 2R in operating, operates relay 2R1 over an obvious circuit; this relay in turn causes its contacts 2R1–2 to close and complete an obvious circuit for the operation of relay 4CWO. Operation of this relay initiates the time delay control circuit 401 resulting, as described above, in closure of contacts 4CWTA–2, 4CWTA–3 and 4CWT–2, 4CWT–3. Accordingly, source 213 applies interrupt tones to the tenant's line, thus indicating to the tenant that a call has been directed to his line by the central office equipment. The tenant may then switch his subset to the central office by momentarily operating his cradle contacts or he may first cause the door to be opened in the manner described above and then transfer the call by momentarily operating his cradle contacts. The circuits respond under these circumstances in the manner described above.

Because this embodiment of our circuit is arranged for both tip and ring party ringing, contacts 5CTT–2 connect the tube 215 to either the tip or ring line. As tenant 019 has been assumed to be a tip party, with relay 5CTT cross connected to ground through contacts 5CT019–5, contacts 5CTT–2 will be operated in this instance.

Central Office Disconnect While Tenant on Lobby Connection

After the tenant places a central office connection on hold, the conversation with the lobby may be of such duration that the party connected through the central office disconnects. In accordance with an aspect of our invention, the line relay 2L is then in series with the common holding bridge across the central office connection. Accordingly, the central office disconnect is detected by the line relay 2L which thereupon causes release of the holding bridge. Specifically, relay 3D0 operates at this time through the closed contacts 3SR–1 and 7LZ–11 and the closed contacts 2L–1. Operation of relay 3D0 opens the hold circuit for relay 7LZ at the now operated break contacts 3DO–2. Relay 7LZ in releasing opens the holding bridge, thereby releasing the central office line.

It is to be understood that the above-described arrangements are illustrative of the application of the principles of the invention. Numerous other arrangements may be devised by those skilled in the art without departing from the spirit and scope of the invention.

We claim:

1. An apartment house telephone system including:
a lobby telephone;
a plurality of apartment tenant telephones;
a line circuit for each of said tenant telephones and connectable to a central office;
a common line relay;
a common hold bridge;
means responsive to said lobby telephone calling one of said tenant telephones for placing said common line relay in the path from said one tenant telephone to the central office for monitoring said one tenant telephone;
means responsive to said common line relay for applying an alerting tone to said one tenant telephone which is busy on a call through its line circuit to the central office;
means including said common line relay and responsive to signals from said one tenant telephone for placing said common line relay in the line circuit to the central office of said one tenant telephone and for connecting said common hold bridge on the tenant telephone side of said line relay whereby said line relay monitors said line circuit to the central office of said one tenant telephone;
means responsive to said common line relay for connecting said one tenant telephone to said lobby telephone;
means for detecting hang up of said one tenant telephone while a call from the central office is held by said hold bridge; and means for thereupon applying a rering signal to said one tenant telephone.

2. An apartment house telephone system including:
a lobby telephone;
a plurality of apartment tenant telephones;
a line circuit for each of said tenant telephones and connectable to a central office;
a common line relay;
a common hold bridge;
means responsive to said lobby telephone calling one of said tenant telephones for placing said common line relay in the path from said one tenant telephone to the central office for monitoring said one tenant telephone;
means including said common line relay and responsive to signals from said one tenant telephone for placing said common line relay in the line circuit to the central office of said one tenant telephone and for connecting said common hold bridge on the tenant telephone side of said line relay, whereby said line relay monitors said line circuit to the central office of said one tenant telephone;
means including said line relay for detecting disconnect of the call from the central office; and
means responsive to said last mentioned means for releasing said hold bridge.

3. An apartment house telephone system including:
a lobby telephone,
a plurality of apartment tenant telephones;
a line circuit for each of said tenant telephones and connectable to a central office;
a common line relay;
a common holding bridge;
means responsive to selection of a particular one of said tenant telephones by said lobby telephone for inserting said line relay in the line circuit for said particular tenant telephone;
means responsive to signals from said selected tenant telephone for thereupon connecting said line relay in said line circuit for said selected tenant telephone, said line relay being then held by the central office;
means for connecting said holding bridge on the central office side of said line relay; and
means for connecting said holding bridge on the tenant telephone side of said line relay when said line relay is connected across said line circuit for said selected tenant telephone.